United States Patent [19]

Hirai

[11] Patent Number: 5,786,777
[45] Date of Patent: Jul. 28, 1998

[54] DATA COMPRESSION COMMUNICATION METHOD BETWEEN A MAIN CONTROL UNIT AND TERMINALS

[75] Inventor: Hayao Hirai, Nagoya, Japan

[73] Assignee: Mitsubishi Denki Kabushiki Kaisha, Tokyo, Japan

[21] Appl. No.: 826,768

[22] Filed: Apr. 7, 1997

Related U.S. Application Data

[63] Continuation of Ser. No. 937,564, Aug. 31, 1992, abandoned.

[30] Foreign Application Priority Data

Sep. 3, 1991 [JP] Japan ..................... 3-222802

[51] Int. Cl.⁶ ..................................... H03M 7/00
[52] U.S. Cl. ..................... 341/55; 341/83; 341/90
[58] Field of Search .................. 341/50, 55, 83, 341/84, 85, 90, 99, 106

[56] References Cited

U.S. PATENT DOCUMENTS

| | | | |
|---|---|---|---|
| 2,810,518 | 10/1957 | Dillon et al. | 235/61 |
| 3,736,412 | 5/1973 | Wright | 235/155 |
| 4,998,206 | 3/1991 | Jones et al. | 364/468 |
| 5,136,291 | 8/1992 | Teague | 341/83 |

FOREIGN PATENT DOCUMENTS

| | | |
|---|---|---|
| 58-181142 | 10/1983 | Japan. |
| 2172341 | 3/1990 | Japan. |

OTHER PUBLICATIONS

Werkstattstechnik, Zeitschrift Fur Industrielle Fertigung, vol. 79, No. 11, Nov. 1989, Berlin DE, pp. 623–627, L. Ulsamer.

IEEE Network: The Magazine of Computer Communications, vol. 2, No. 3, May 1988, New York, U.S., pp. 48–54, L. Stintonen & T. Virvalo.

EDN Electrical Design News, vol. 29, No. 24, Nov. 1984, Newton, MA pp. 240–242, D.M. Acre.

Revue Generale De L'Electricite No. 5, May 1989, Paris, FR, pp. 2–13, P. Rolin.

Primary Examiner—Howard L. Williams
Attorney, Agent, or Firm—Rothwell, Figg, Ernst & Kurz, P.C.

[57] ABSTRACT

The decimal numbers in ASCII code are converted into base n number codes, where the base n is greater than ten, and then are transmitted between the main control unit and the terminals including servo systems and spindle systems in an automated factory system. The data is thus compressed, and greater number of axes of the numerically controlled devices, etc., can be controlled within a predetermined time length for transmitting the data.

22 Claims, 19 Drawing Sheets

CONVERSION TABLE FROM BASE 10 TO BASE 36 CODE

| LDS \ 7MSD's | 0 | 1 | 2 | 3 | 4 | 5 | 6 | 7 | 8 | 9 |
|---|---|---|---|---|---|---|---|---|---|---|
| 0000000 | 0 | 1 | 2 | 3 | 4 | 5 | 6 | 7 | 8 | 9 |
| 0000001 | A | B | C | D | E | F | G | H | I | J |
| 0000002 | K | L | M | N | O | P | Q | R | S | T |
| 0000003 | U | V | W | X | Y | Z | 10 | 11 | 12 | 13 |
| 0000004 | 14 | 15 | 16 | 17 | 18 | 19 | 1A | 1B | 1C | 1D |
| 0000005 | 1E | 1F | 1G | 1H | 1I | 1J | 1K | 1L | 1M | 1N |
| 0000006 | 1O | 1P | 1Q | 1R | 1S | 1T | 1U | 1V | 1W | 1X |
| 0000007 | 1Y | 1Z | 20 | 21 | 22 | 23 | 24 | 25 | 26 | 27 |
| 0000008 | 28 | 29 | 2A | 2B | 2C | 2D | 2E | 2F | 2G | 2H |
| 0000009 | 2I | 2J | 2K | 2L | 2M | 2N | 2O | 2P | 2Q | 2R |
| 0000010 | 2S | 2T | 2U | 2V | 2W | 2X | 2Y | 2Z | 30 | 31 |
| 0000011 | 32 | 33 | 34 | 35 | 36 | 37 | 38 | 39 | 3A | 3B |
| 0000012 | 3C | 3D | 3E | 3F | 3G | 3H | 3I | 3J | 3K | 3L |
| 0000013 | 3M | 3N | 3O | 3P | 3Q | 3R | 3S | 3T | 3U | 3V |
| 0000014 | 3W | 3X | 3Y | 3Z | 40 | 41 | 42 | 43 | 44 | 45 |
| 0000015 | 46 | 47 | 48 | 49 | 4A | 4B | 4C | 4D | 4E | 4F |
| 0000016 | 4G | 4H | 4I | 4J | 4K | 4L | 4M | 4N | 4O | 4P |
| 0000017 | 4Q | 4R | 4S | 4T | 4U | 4V | 4W | 4X | 4Y | 4Z |
| 0000018 | '' | '' | '' | '' | '' | '' | '' | '' | | |
| ,,,,,,, | '' | '' | '' | '' | '' | '' | | | | |
| ,,,,,,, | '' | '' | '' | | | | | | '' | '' |
| ,,,,,,, | '' | '' | | | | | '' | '' | '' | '' |
| | | | | | '' | '' | '' | '' | '' | '' |
| | | '' | '' | '' | '' | '' | '' | '' | '' | '' |
| ,,,,,,, | '' | '' | '' | '' | '' | '' | '' | '' | '' | '' |
| ,,,,,,, | '' | '' | '' | '' | '' | '' | '' | '' | '' | '' |
| ,,,,,,, | '' | '' | '' | '' | '' | '' | '' | '' | '' | '' |
| 9999996 | '' | '' | '' | '' | '' | '' | '' | '' | '' | '' |
| 9999997 | 1NJCGY | 1NJCGZ | 1NJCH0 | 1NJCH1 | 1NJCH2 | 1NJCH3 | 1NJCH4 | 1NJCH5 | 1NJCH6 | 1NJCH7 |
| 9999998 | 1NJCH8 | 1NJCH9 | 1NJCHA | 1NJCHB | 1NJCHC | 1NJCHD | 1NJCHE | 1NJCHF | 1NJCHG | 1NJCHH |
| 9999999 | 1NJCHI | 1NJCHJ | 1NJCHK | 1NJCHL | 1NJCHM | 1NJCHN | 1NJCHO | 1NJCHP | 1NJCHQ | 1NJCHR |

FIG. 6

CONVERSION TABLE FROM BASE 36 CODE TO BASE 10

| LSD \ 5MSD's | 0 | 1 | 2 | 3 | 4 | 5 | 6 | 7 | 8 | 9 | A | B | C | D | E | F | G | H | I | J | K | L | M | N | O | P | Q | R | S | T | U | V | W | X | Y | Z |
|---|---|---|---|---|---|---|---|---|---|---|---|---|---|---|---|---|---|---|---|---|---|---|---|---|---|---|---|---|---|---|---|---|---|---|---|---|
| 00000 | 0 | 1 | 2 | 3 | 4 | 5 | 6 | 7 | 8 | 9 | · | · | · | · | · | · | · | · | · | · | · | · | · | · | · | · | · | · | · | · | · | · | · | · | · | · |
| 00001 | 36 | 37 | 38 | 39 | 40 | 41 | 42 | 43 | 44 | 45 | · | · | · | · | · | · | · | · | · | · | · | · | · | · | · | · | · | · | · | · | · | · | · | · | · | 71 |
| 00002 | · | · | · | · | · | · | · | · | · | · | · | · | · | · | · | · | · | · | · | · | · | · | · | · | · | · | · | · | · | · | · | · | · | · | · | · |
| 00003 | · | · | · | · | · | · | · | · | · | · | · | · | · | · | · | · | · | · | · | · | · | · | · | · | · | · | · | · | · | · | · | · | · | · | · | · |
| 00004 | · | · | · | 147 | 148 | 149 | 150 | (151) | 152 | 153 | · | · | · | · | · | · | · | · | · | · | · | · | · | · | · | · | · | · | · | · | · | · | · | · | · | · |
| 00005 | · | · | · | · | · | · | · | · | · | · | · | · | · | · | · | · | · | · | · | · | · | · | · | · | · | · | · | · | · | · | · | · | · | · | · | · |
| 00006 | | | | | | | | | | | | | | | | | | | | | | | | | | | | | | | | | | | | |
| 00007 | | | | | | | | | | | | | | | | | | | | | | | | | | | | | | | | | | | | |

FIG. 7

CONVERSION TABLE FROM BASE 10 TO STEPPED BASE 36 CODE

| 5 MSD's \ LSD | 0 | 1 | 2 | 3 | 4 | 5 | 6 | 7 | 8 | 9 |
|---|---|---|---|---|---|---|---|---|---|---|
| 00000 | 0 | 1 | 2 | 3 | 4 | 5 | 6 | 7 | 8 | 9 |
| 00001 | 5 | 6 | 7 | 2 | 2 | 3 | 3 | 4 | 4 | 5 |
| 00002 | A | B | B | C | C | D | D | E | E | A |
| 00003 | F | G | G | H | H | | | | | F |

FIG. 8

CONVERSION TABLE FROM STEPPED BASE 36 CODE TO BASE 10

| 2MSD's \ LSD | 0 | 1 | 2 | 3 | 4 | 5 | 6 | 7 | 8 | 9 | A | B | C | D | E | F | G | H | ... | W | X | Y | Z |
|---|---|---|---|---|---|---|---|---|---|---|---|---|---|---|---|---|---|---|---|---|---|---|---|
| 00 | 0 | 2 | 4 | 6 | 8 | 10 | 12 | 14 | 16 | 18 | 20 | 22 | 24 | 26 | 28 | 30 | 32 | 34 | . | 64 | 66 | 68 | 70 |
| 01 | 72 | 74 | 76 | 78 | 80 | 82 | 84 | 86 | . | . | . | . | . | . | . | . | . | . | . | 134 | 136 | 138 | 140 |
| 02 | 142 | 144 | 146 | 148 | 150 | 152 | . | . | . | . | . | . | . | . | . | . | . | . | . | 204 | 206 | 208 | 210 |
| 03 | 212 | 214 | 216 | 218 | 220 | 222 | . | . | . | . | . | . | . | . | . | . | . | . | . | 276 | 278 | 280 | 350 |

FIG. 9

| DATA ITEMS | BASE 10 | | BASE 36 | |
|---|---|---|---|---|
| | MAXIMUM | BYTES | MAXIMUM | BYTES |
| (a) POSITION DATA | 99999999 (10) | 8 | 1NJCHR(36) | 6 |
| (b) SPEED DATA | 999999 (10) | 6 | LFLR(36) | 4 |
| (c) CONTROL DATA(1) | 9 (10) | 1 | J(36) | 1 |
| (d) CONTROL DATA(2) | 9 (10) | 1 | | |
| (e) GAIN SIGNAL (1) | 99999(10) | 5 | 255R(36) | 4 |
| (f) GAIN SIGNAL (2) | 999 (10) | 3 | RR(36) | 2 |
| TOTAL BYTES OF RECEIVED DATA | | 24 | | 17 |
| (g) POSITION FEEDBACK DATA | 99999999 (10) | 8 | 1NJCHR(36) | 6 |
| (h) SPEED FEEDBACK DATA | 999999 (10) | 6 | LFLR(36) | 4 |
| (i) LOAD FEEDBACK DATA | 9999 (10) | 4 | 7PR(36) | 3 |
| (j) ALARM SIGNAL | 999 (10) | 3 | RR(36) | 2 |
| TOTAL BYTES OF TRANSMITTED DATA | | 21 | | 15 |

N.B. THE SUFFIXES (10) & (36) REPRESENT THE BASE OF THE NUMBERS

FIG. 10

CONVERSION TABLE FROM DECIMALLY CODED BASE 36 TO BASE 36 CODE

| DECIMALLY CODED BASE 36 | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| BASE 36 CODE | 0 | 1 | 2 | 3 | 4 | 5 | 6 | 7 | 8 | 9 | A | B | C | D | E |

| 15 | 16 | 17 | 18 | 19 | 20 | 21 | 22 | 23 | 24 | 25 | 26 | 27 | 28 | 29 | 30 | 31 | 32 | 33 | 34 | 35 |
|---|---|---|---|---|---|---|---|---|---|---|---|---|---|---|---|---|---|---|---|---|
| F | G | H | I | J | K | L | M | N | O | P | Q | R | S | T | U | V | W | X | Y | Z |

FIG. II

CONVERSION TABLE FROM BASE 36 CODE TO DECIMALLY CODED BASE 36

| BASE 36 CODE | 0 | 1 | 2 | 3 | 4 | 5 | 6 | 7 | 8 | 9 | A | B | C | D | E |
|---|---|---|---|---|---|---|---|---|---|---|---|---|---|---|---|
| DECIMALLY CODED BASE 36 | 0 | 1 | 2 | 3 | 4 | 5 | 6 | 7 | 8 | 9 | 10 | 11 | 12 | 13 | 14 |

| F | G | H | I | J | K | L | M | N | O | P | Q | R | S | T | U | V | W | X | Y | Z |
|---|---|---|---|---|---|---|---|---|---|---|---|---|---|---|---|---|---|---|---|---|
| 15 | 16 | 17 | 18 | 19 | 20 | 21 | 22 | 23 | 24 | 25 | 26 | 27 | 28 | 29 | 30 | 31 | 32 | 33 | 34 | 35 |

FIG. 19
PRIOR ART

| | | LABEL ELEMENT / DATA ELEMENT / END ELEMENT | LENGTH IN BYTES |
|---|---|---|---|
| (a) | POSITION DATA | 3, 8, 1 | 12 BYTES |
| (b) | SPEED DATA | 3, 6, 1 | 10 BYTES |
| (c) | CONTROL DATA (1) | 3, 1, 1 | 5 BYTES |
| (d) | CONTROL DATA (2) | 3, 1, 1 | 5 BYTES |
| (e) | GAIN SIGNAL (1) | 5, 5, 1 | 11 BYTES |
| (f) | GAIN SIGNAL (2) | 5, 3, 1 | 9 BYTES |

TOTAL BYTES OF RECEIVED DATA  52 BYTES

| | | LABEL ELEMENT / DATA ELEMENT / END ELEMENT | LENGTH IN BYTES |
|---|---|---|---|
| (g) | POSITION FEEDBACK DATA | 3, 8, 1 | 12 BYTES |
| (h) | SPEED FEEDBACK DATA | 3, 6, 1 | 10 BYTES |
| (i) | LOAD FEEDBACK DATA | 3, 4, 1 | 8 BYTES |
| (j) | ALARM SIGNAL | 3, 3, 1 | 7 BYTES |

TOTAL BYTES OF TRANSMITTED DATA  37 BYTES

DATA COMPRESSION COMMUNICATION METHOD BETWEEN A MAIN CONTROL UNIT AND TERMINALS

This is a continuation of application Ser. No. 07/937,564, filed Aug. 31, 1992 now abandoned.

BACKGROUND OF THE INVENTION

This invention relates to serial data transmission methods between the main control unit and various terminals within factory automation (FA) control systems, etc. For example, this invention relates to serial data transmission method between the main control unit and the terminals within a numerically controlled machine tools system, such as the display system, the servo systems, the spindle systems, etc., The data transmission within an automated factory system (for example, the data transmission between the main control unit and the various terminals of numerically controlled machine tools, such as the display system, the servo systems and the spindle systems) is effected either (1) by means of a bus-connection or a serial transmission utilizing two-port RAMs that can be written and read bidrectionally (i.e., at two ports), or (2) by means of independent memories disposed at the main control unit and the terminals respectively, the transmission and reception of the data or the request signals to and from the memories being effected via a sequential transmission line. Next, the second mentioned method of data transmission is described, wherein single optical fibers connect the memories of the main control unit and the various terminals.

FIG. 18 is a block diagram showing the organization of an automated factory system. The main control unit 1 consists of a control unit 101, a memory 102, and an input/output interface 103. The terminals include a display system 2, servo systems 3, and spindle systems 4, connected to the main control unit 1 via respective single optical fiber cables 5, 6. Each system of the terminals 2, 3, and 4 includes a control unit 201,301, 401, a memory 202,302, 402, and an input/output interface 203,303, 403. In addition, the display system 2 includes a display 204. Each of the servo systems 3 includes a servo motor 304. Each of the spindle systems 4 includes a spindle motor 404.

The data transmission via the optical fiber cables 5 and 6 between the main control unit 1 and the terminals 2, 3, and 4 is bidirectional. The data and the parameters necessary for the control of the numerically controlled machine tools etc., which are generated by the control unit 101 of the main control unit 1 are first stored in the memory 102. The data which are stored temporarily in the memory 102 and the parameters which are periodically updated are transmitted via the respective optical fiber cables 5 and 6 to the respective input/output interface 203,303, and 403 of the display system 2, servo systems 3, and spindle systems 4, respectively, to be stored therein. The control unit 201,301, 401 of each system of the respective terminals effect respective functions (the displaying of information upon the display 204 in the case of the display system 2, and the controlling of the servo motor 304 or the spindle motor 404 in the case of the servo systems 3 or the spindle systems 4) on the basis of these data and parameters stored in their respective memories.

On the other hand, the data detected or input at the terminals, such as the display system 2, the servo systems 3, and the spindle systems 4, are converted into predetermined data formats by the respective control unit 201,301, 401, and, after temporarily stored in respective memory 202,302, and 402, are transmitted when necessary to the memory 102 of the main control unit 1 via the respective input/output interface 203,303, 403, the optical fiber cable 5, 6, and the input/output interface 103 of the control unit 101. The data transmission is effected, for example, in accordance with the industrial standards: RS232C, RS363, RS404, RS491, RS422 as determined by the EIA (Electronics Industries Association). The transmission speed, however, is limited by the performances of the devices used for transmission. Further, the maximum transmission speed by the serial data transmission by means of the RS491 is 19200 bits per seconds. The maximum transmission speed by means of the RS422 is 2 megabits per second.

The data and signals transmitted from the main control unit 1 to the servo systems 3 or the spindle systems 4 include the position data, the speed data, the control data, and the gain signals. The feedback signals transmitted from the servo systems 3 or the spindle systems 4 to the main control unit 1 include the position feedback data, the speed feedback data, the load feedback data, and the alarm signals. In addition, the parameters for more than twenty items for each of the servo and the main spindles are transmitted, when necessary, from the main control unit 1 to the servo systems 3 or the spindle systems 4

Among the above data, the data received at the servo systems 3 and the spindle systems 4 (the position data, the speed data, the control data, the gain signals, etc.) And the data transmitted therefrom (the position feedback data, the speed feedback data, the load feedback data, the alarm signals, etc.) Include data for a plurality of axes of the servo systems 3 or the spindle systems 4 within a predetermined control time interval.

FIG. 19 is a diagram showing the data formats of the information transmitted between the main control unit and the terminals. The data and signals are transmitted using ASCII codes (American Standard Code for Information Interchange). The data or signal received at the servo systems 3 or the spindle systems 4, each consisting of a label element, data element, and an end element, includes: position data (a) couched in 12 bytes, speed data (b) in 10 bytes, first control data (c) in 5 bytes, second control data (d) in 5 bytes, first gain signal (e) in 11 bytes, and second gain signal (f) in 9 bytes. (The number of bytes is the sum of the numbers of bytes of the label element, the data element, and the end element. The length of each element in bytes is represented in respective scale diagrams in FIG. 19.) The data received at the servo systems 3 or the spindle systems 4 thus totals to 52 bytes.

The data and signals transmitted from the servo systems 3 or the spindle systems 4 to the main control unit 1 includes: the position feedback data (g) couched in 12 bytes, the speed feedback data (h) in 10 bytes, the load feedback data (i) in 8 bytes, and the alarm signal (j) in 7 bytes. Each of these data or signals likewise consists of a label element, a data element, and an end element. The total bytes of transmitted data amounts to 37 bytes.

FIG. 20 is a diagram showing the data received and transmitted within a predetermined interval of control time (IT). The servo systems 3 and the spindle systems 4 include a plurality of axes. Thus, the received and the transmitted information within a predetermined interval of control time (IT) includes data for n axes, where n is the number of controlled axes. To mark the start and the end of the received and the transmitted data, the start data of 2 bytes and the end data of 1 byte is added to the received and the transmitted data, respectively. The whole data including the received and the transmitted data must be transmitted within a single IT (predetermined interval of control time). FIG. 20 shows the case where the total transmission time for the received and the transmitted data is exactly equal to one IT (predetermined interval of control time). In general the total transmission time may be less than one IT, to leave an allowance or margin at the end of each IT. The total bytes to be transmitted within one IT are: (2+1)+52n+(2+1)+37n bytes. If the EIA-RS404 standard is used for transmission of bytes, 10 bits are required for transmitting a single byte. Further, in accordance with the EIA-RS422 standard, the data transmission speed is 2 megabits per second. Thus, assuming that the length of one IT is equal to 2 milliseconds, the number n of axes that can be controlled within one IT is:

$$(2+1)\times 10+52n\times 10+(2+1)\times 10+37n\times 10=2000000\times 0.002 \quad (1)$$

Simplifying the above equation, we obtain:

$$60+890n=4000 \quad (1')$$

and hence approximately, $$n=4.43 \quad (1'')$$

It can thus be concluded that up to four axes can be controlled.

Thus, in accordance with the above conventional method of data transmission, it is possible to control up to four spindles or axes of the servo systems 3 or the spindle systems 4. In the case of the numerically controlled machine tools, this implies that the conventional method is applicable to single-spindle one-saddle lathes or single-spindle-head machining centers. The conventional method of data transmission, however, cannot be used for controlling machine tools including auxiliary axes, or the multi-system lathes or machining centers including a plurality of main spindles and saddles.

Recently, the number of controlled axes of numerically controlled machine tools, etc., is increasing due to the requirement for higher level automation with multi-functionality, and also due to the requirement for higher performance and the conversion of the PLC (Programmable Logic Controller) axes to the numerically controlled axes. Further, in addition to the conventional serial data transmission, the data transmission via a single optical fiber cable is becoming a priority item, together with the reduction of the number of assembly steps of the machine tools, etc., the reduction of frequency of occurrences of failures, and the improvements on the resistance against the external noises.

Under this circumstance, the conventional serial data transmission method with the maximum four axes control cannot meet the above needs. The increase in the number of controllable spindles or axes is an urgent requirement.

SUMMARY OF THE INVENTION

It is therefore an object of this invention to provide a data transmission method satisfying the conventional data transmission standards, wherein the amount of transmitted information and hence the number of controlled axes can be increased.

The above object is accomplished in accordance with the principle of this invention by a data transmission method between information units connected by a transmission line for transmitting data including decimal numbers represented in a character representation code system, the data transmission method comprising the steps of: converting decimal numbers in the character representation code system into base n number codes in the character representation code system, wherein the base n is greater than ten, the conversion from decimal numbers to base n number codes being effected at a transmitting unit; and transmitting base n number codes from the transmission unit to a receiving unit via the transmission line. Preferably, the data transmission method further comprises the step of restoring at the receiving unit the decimal numbers from the base n number codes. Further, it is preferred that the character representation code system consists of a character coding system in accordance with American Standard Code for Information Interchange.

The conversion is effected by means of a software logic implemented by a program, a table lookup method, based on a conversion table establishing correspondence from decimal numbers to the base n number codes, or a stepped conversion table lookup method. The stepped conversion table may establish a correspondence from decimal numbers rounded to a closest multiple of an integer to the base n number codes corresponding to the rounded decimal numbers divided by the integer, wherein the integer is equal to or greater than two.

BRIEF DESCRIPTION OF THE DRAWINGS

The features which are believed to be characteristic of this invention are set forth with particularity in the appended claims. The structure and method of operation of this invention itself, however, will be best understood from the following detailed description, taken in conjunction with the accompanying drawings, in which:

FIG. 5 is a table showing the conversion of the numbers represented in base 10 into corresponding base 36 codes, where the rightmost column shows the seven most significant digits of the base 10 numbers and the head row shows the least significant digit thereof;

FIG. 6 is a table showing the conversion of the numbers represented in base 36 codes into corresponding decimal numbers, where the rightmost column shows the five most significant digits of the base 36 code numbers and the head row shows the least significant digit thereof;

FIG. 7 shows a stepped conversion table for converting the six-digit base 10 numbers into base 36 codes stepped by two, where the rightmost column shows the five most significant digits of the base 10 numbers and the head row shows the least significant digit thereof;

FIG. 8 shows a reverse stepped conversion table for restoring the stepped base 36 codes, as obtained using the table of FIG. 7, into corresponding six-digit decimal numbers stepped by two, where the rightmost column shows the two most significant digits of the base 36 code numbers and the head row shows the least significant digits thereof;

FIG. 9 is a table comparing the fixed block data transmission formats in accordance with the base 10 (the left column) number coding and the base 36 codings (the right column) between the main control unit 1 and the servo systems 3 or the spindle systems 4 of FIG. 18;

FIG. 10 is a conversion table from decimally coded base 36 numbers to base 36 code digits;

FIG. 11 is a conversion table from the base 36 code digits to decimally coded base 36 numbers;

FIG. 17 is a diagram showing the system similar to that of FIG. 16, from which, however, the cell controllers are dispensed with;

FIG. 19 is a diagram showing the conventional data formats of the information transmitted between the main control unit and the terminals.

In the drawings, like reference numerals represent like or corresponding parts or portions.

DETAILED DESCRIPTION OF THE PREFERRED EMBODIMENTS

Referring now to the accompanying drawings, the preferred embodiments of this invention are described.

Figure 18:
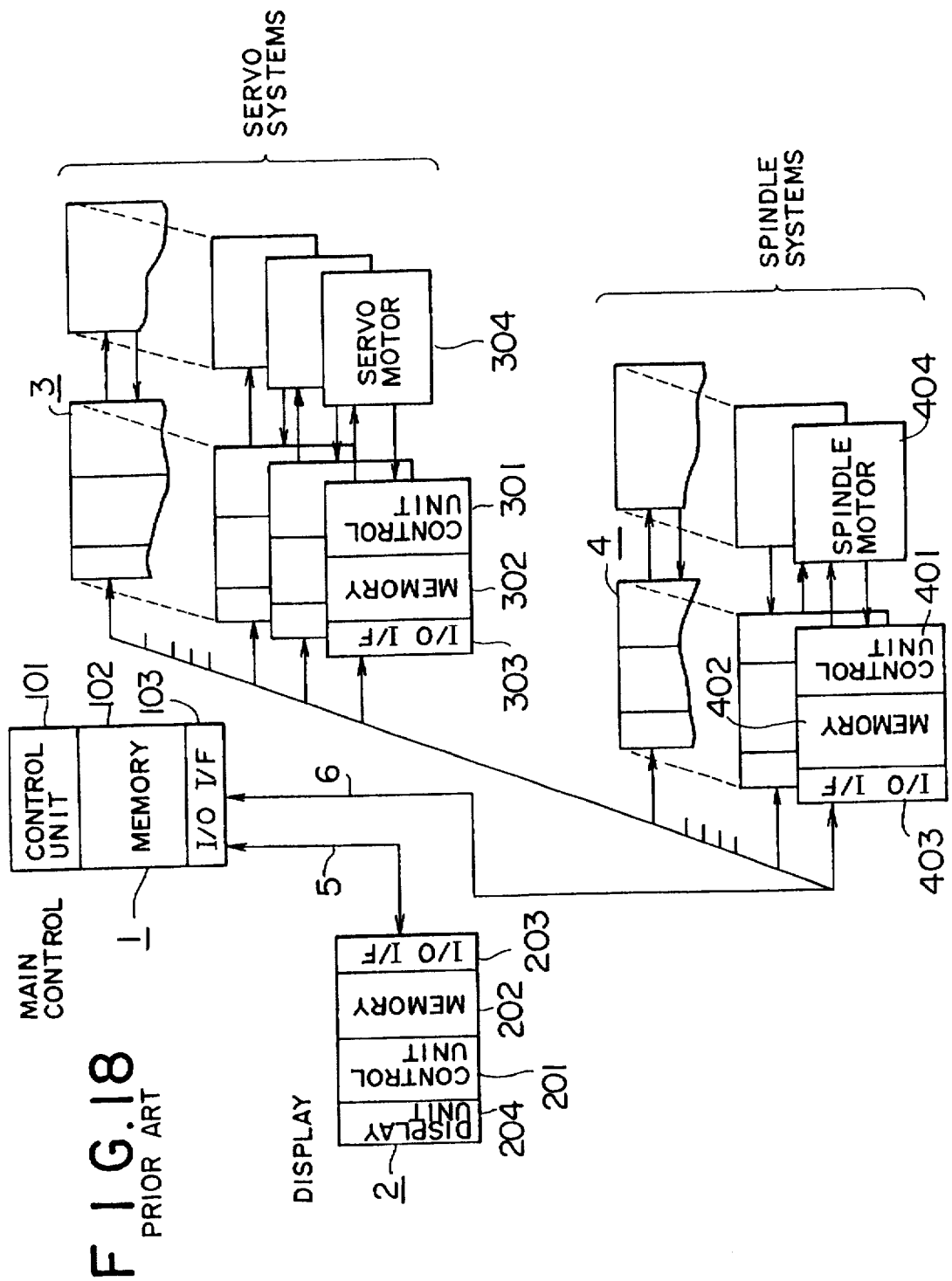
FIG. 18 is a block diagram showing the organization of an automated factory system.
Figure 20:
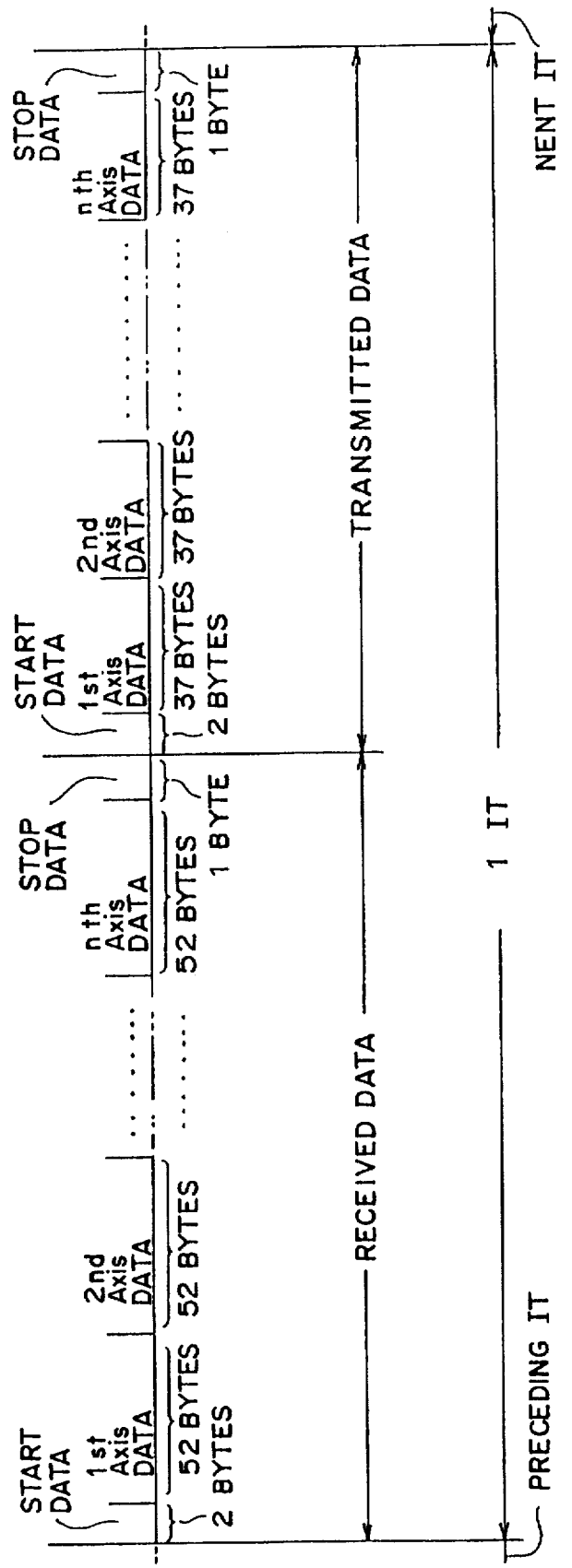
FIG. 20 is a diagram showing the conventional data received and transmitted within a predetermined interval of control time (IT).

FIG. 9 is a table comparing the fixed block data transmission formats in accordance with the base 10 (the left column) number coding and the base 36 codings (the right column) between the main control unit 1 and the servo systems 3 or the spindle systems 4 of FIG. 18. The maximum value of the position data (a) is represented in an eight digit number 99,999,999 in base 10. Thus, to represent the position data in decimal (base 10), eight (8) bytes are required. By dividing the maximum data 99999999 by 36 successively and obtaining the successive remainders, the decimally coded hexatrigintal (base 36) number can be obtained. Thus, the maximum data value can be represented in decimally coded hexatrigintal (base 36) in six blocks: [1] [23] [19] [12] [17] [27] (decimally coded base 36). The same is represented as 1NJCHR in base 36 code, where the numbers 10 through 35 are represented by alphabets A through Z as shown in FIG. 10. Thus, the position data represented by base 36 can be compressed into six bytes.

Similarly, the maximum value of the speed data (b) is represented by a six digit decimal number 999999 (base 10). Thus, to represent the speed data in decimal, six (6) bytes are required. The same maximum can be represented in decimally coded hexatrigintal (base 36) in four blocks: [21] [15] [21] [27] (decimally coded base 36). The same maximum is represented as LFLR in base 36 code, which is thus couched in four bytes.

The maximum values of the first control data (c) and the second control data (d) are each represented by a single digit decimal number 9 (base 10). Thus, the two data items, each ranging from 0 to 9 (base 10), are combined into a single data item with a common label. The value of the resulting combined control data ranges from 0 to 19 (base 10). Then, the maximum value of the combined data can be represented in decimally coded hexatrigintal (base 36) in one block: [19] (decimally coded base 36). The same maximum is represented by a single byte in base 36 code: J (base 36).

The maximum value of the first gain signal (e) is represented by a five digit decimal number 99999 (base 10). Thus, to represent the first gain signal in decimal, five (5) bytes are required. The maximum value can be represented in decimally coded hexatrigintal (base 36) in four blocks: [2] [5] [5] [27] (decimally coded base 36). The same maximum is represented as 255R (base 36) in base 36 code, which can thus be couched in four bytes. Similarly, the maximum value of the second gain signal (f) is represented by a three digit decimal number 999 (base 10). Thus, to represent the second gain signal in decimal, three (3) bytes are required. The maximum value can be represented in decimally coded hexatrigintal (base 36) in two blocks: [27] [27] (decimally coded base 36). The same maximum is represented as RR (base 36) in base 36 code, which can be couched in two bytes.

Further, the maximum value of the position feedback data (g) is represented by an eight digit decimal number 99999999 (base 10). Thus, to represent the position feedback data in decimal, eight (8) bytes are required. The maximum value can be represented in decimally coded hexatrigintal (base 36) in six blocks: [1] [23] [29] [12] [17] [27] (decimally coded base 36). The same maximum is represented as 1NJCHR (base 36) in base 36 code, which can be couched in six bytes.

Similarly, the maximum value of the speed feedback data (h) is represented by a six digit decimal number 999999 (base 10). Thus, to represent the speed feedback data in decimal, six (6) bytes are required. The maximum value can be represented in decimally coded hexatrigintal (base 36) in four blocks: [21] [15] [21] [27] (decimally coded base 36). The same maximum is represented as LFLR (base 36) in base 36 code, which can be couched in four bytes.

The maximum value of the load feedback data (i) is represented by a four digit decimal number 9999 (base 10). Thus, to represent the load feedback data in decimal, four (4) bytes are required. The maximum value can be represented in decimally coded hexatrigintal (base 36) in three blocks: [7] [25] [27] (decimally coded base 36). The same maximum is represented as 7PR (base 36) in base 36 code, which can be couched in three bytes.

The maximum value of the alarm signal (i) is represented by a four three decimal number 999 (base 10). Thus, to represent the alarm signal in decimal, three (3) bytes are required. The maximum value can be represented in decimally coded hexatrigintal (base 36) in two blocks: [27] [27] (decimally coded base 36). The same maximum is represented as RR (base 36) in base 36 code, which can be couched in two bytes.

Thus, utilizing the base 36 code, the data received at the servo systems 3 or the spindle systems 4 (see FIG. 18) can be compressed into 17 bytes, compared to 24 bytes for base 10. Further, the label and the end element for the control data are shared. Thus, the total number of bytes of received data including the label and the end elements for respective data items, which amounted to 52 bytes in the case of base 10

(see FIG. 19), can be compressed into 41 bytes by adopting the base 36 code. Similarly, the data transmitted from the servo systems 3 or the spindle systems 4 is compressed into 15 bytes in base 36, compared to 21 bytes for base 10. Thus, the total number of bytes of transmitted data including the label and the end elements for respective data items are reduced to 31 bytes, compared to 37 for the base 10 (see FIG. 19). Consequently, when the information is transmitted by the base 36 coding, the number n of spindles or axes that can be controlled within one IT (predetermined interval of control time) is:

$$(2+1)\times 10+41n\times 10+(2+1)\times 10+31n\times 10=2000000\times 0.002 \quad (2)$$

Simplifying the above equation, we obtain:

$$60+720n=4000 \quad (2')$$

and hence approximately, $$n=5.42 \quad (2'')$$

Thus, up to five axes can be controlled.

Figure 12:
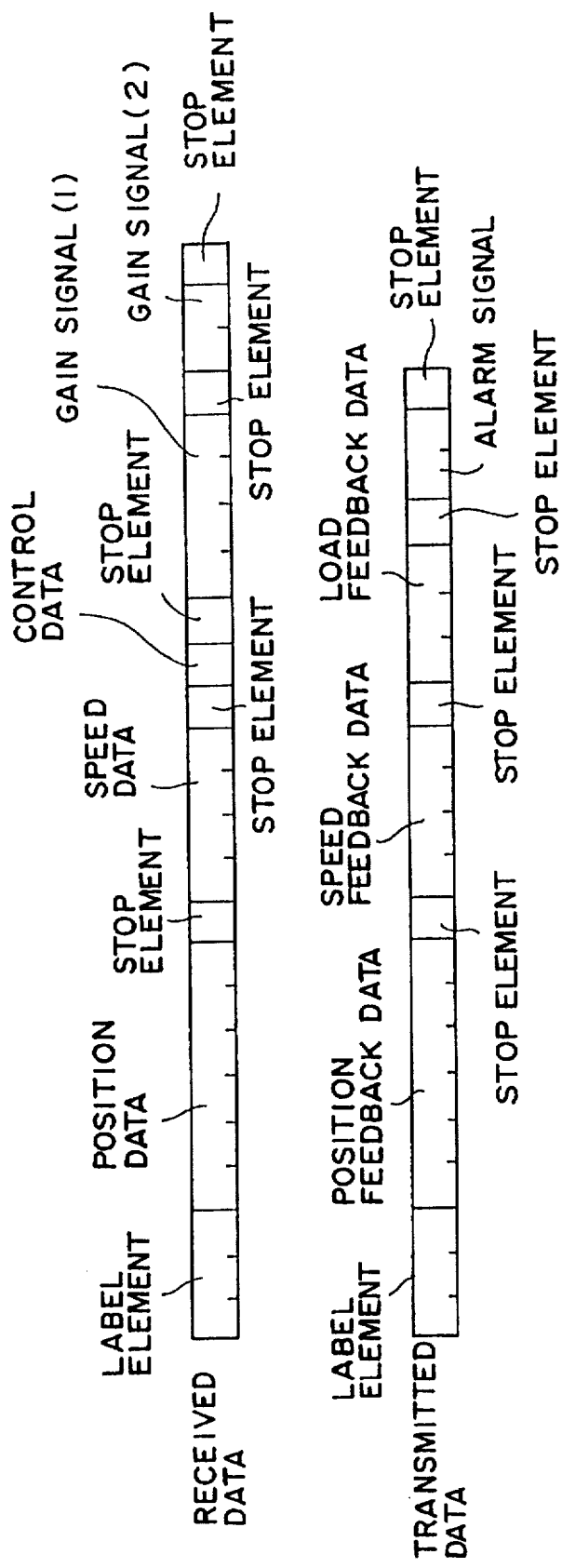
FIG. 12 is a diagram showing the data formats for the received and the transmitted data in which the internal label elements are eliminated.

In the above discussion, the information is transmitted in a fixed block data format with a label for each one of the data items. FIG. 12 is a diagram showing the data formats for the received and the transmitted data in which the internal label elements are eliminated. Namely, in the case of the data received at the servo systems 3 or the spindle systems 4 of FIG. 18, the labels are eliminated except at the head of the position data. The received data is thereby compressed by 16 bytes. In the case of the data transmitted from the servo systems 3 or the spindle systems 4, the labels are eliminated except at the head of the position feedback data. The transmitted data is thereby compressed by 9 bytes.

Then, the number n of spindles or axes that can be controlled within one IT (predetermined interval of control time) is:

$$(2+1)\times 10+25n\times 10+(2+1)\times 10+22n\times 10=2000000\times 0.002 \quad (3)$$

Simplifying the above equation, we obtain:

$$60+470n=4000 \quad (3')$$

and hence approximately, $$n=8.38 \quad (3'')$$

Thus, up to eight axes can be controlled.

Figure 13:
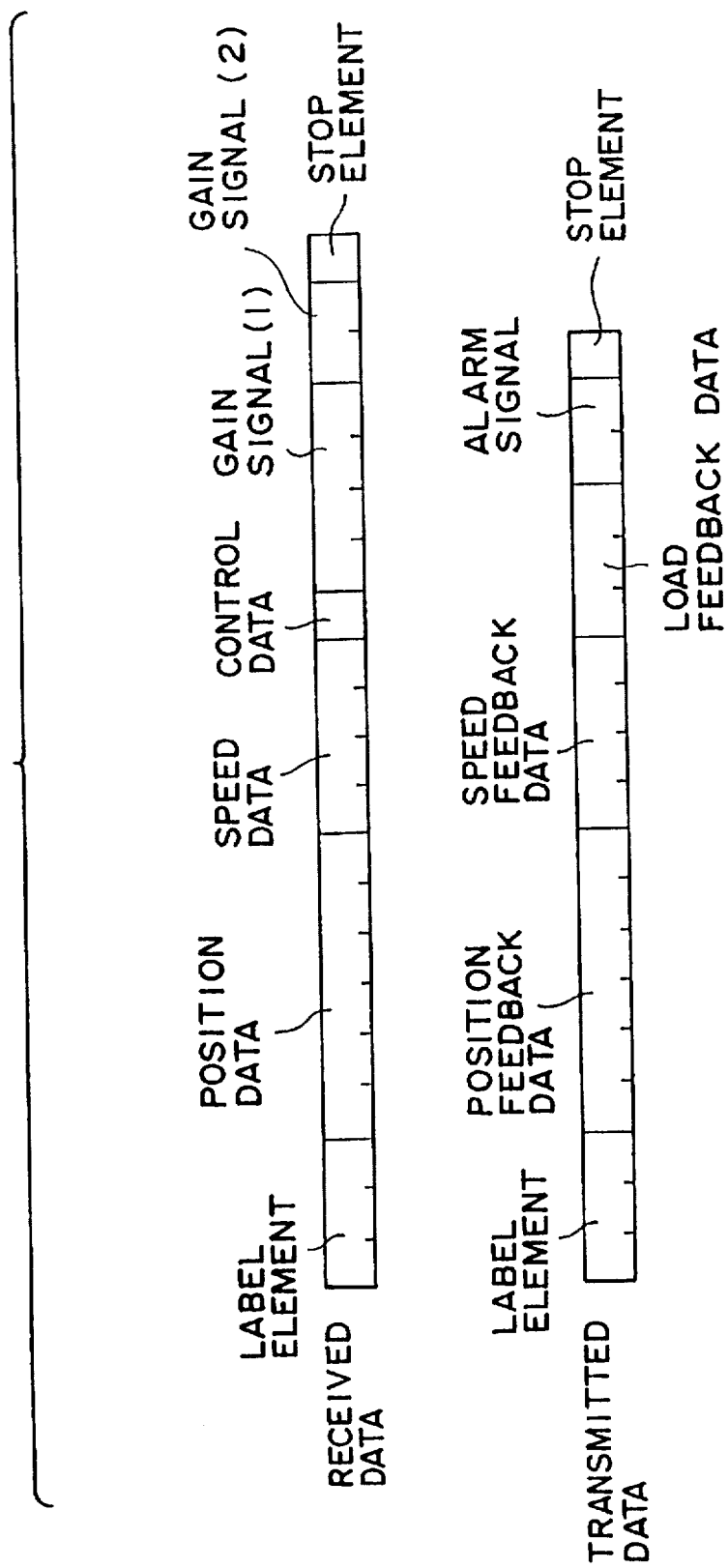
FIG. 13 is a diagram showing the data formats of the received and transmitted data in which the internal label elements and stop elements are eliminated.

FIG. 13 is a diagram showing the data formats of the received and transmitted data in which the internal label elements and stop elements are eliminated. Namely, in addition to the internal label elements, the internal stop elements are eliminated except at the tail of the second gain signal and the alarm signal for the data received at and transmitted from the servo systems 3 or the spindle systems 4 of FIG. 18, respectively. Then, the received and the transmitted data can be compressed by four and three bytes, respectively. Then, the number n of spindles or axes that can be controlled within one IT (predetermined interval of control time) is:

$$(2+1)\times 10+21n\times 10+(2+1)\times 10+19n\times 10=2000000\times 0.002 \quad (4)$$

Simplifying the above equation, we obtain:

$$60+400n=4000 \quad (4')$$

and hence approximately, $$n=9.85 \quad (4'')$$

Thus, up to nine axes can be controlled.

Figure 14:
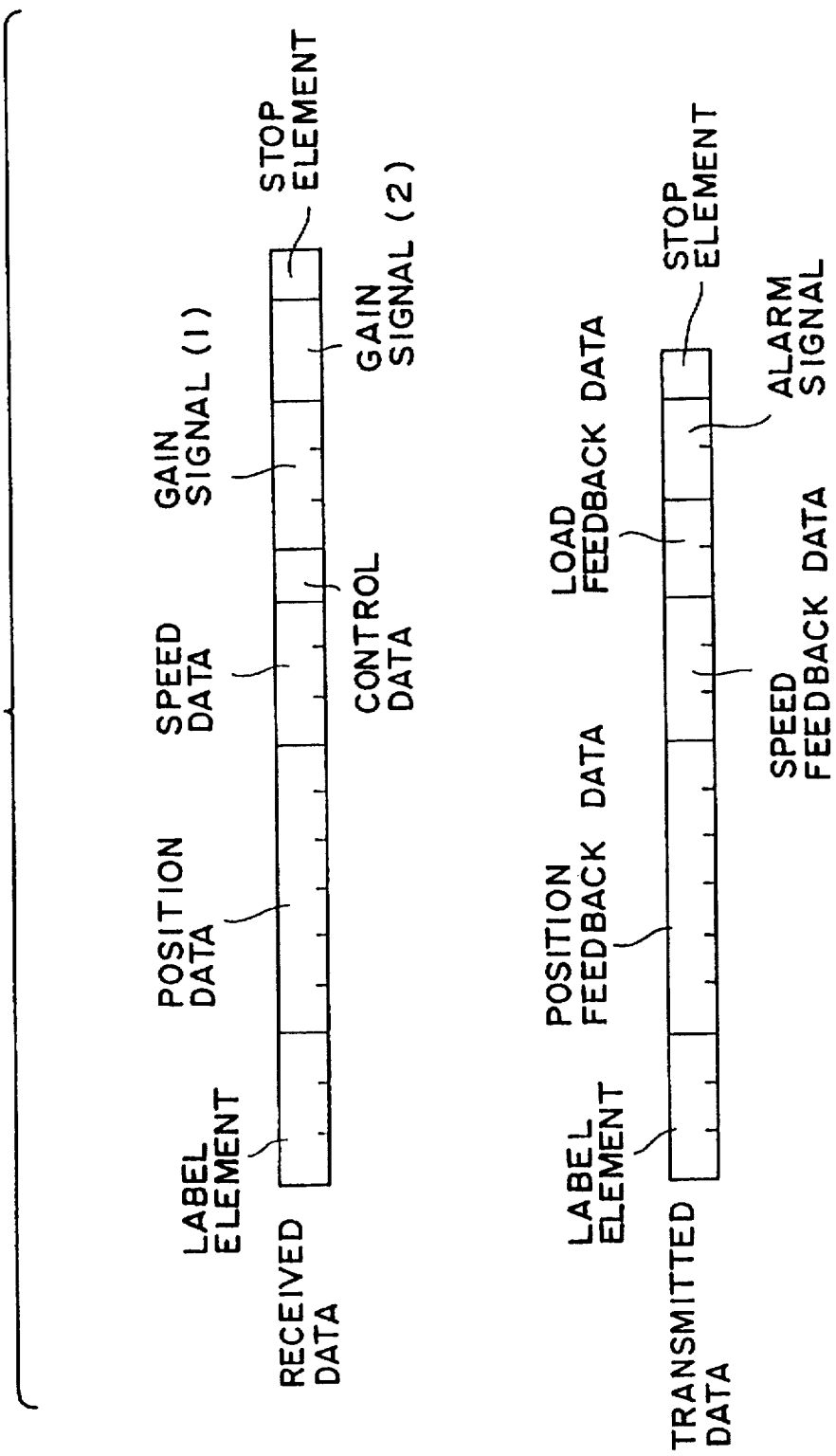
FIG. 14 is a diagram showing the data formats of the received and transmitted data similar to FIG. 13, in which, however, the data items are further compressed.

FIG. 14 is a diagram showing the data formats of the received and transmitted data similar to FIG. 13, in which, however, the data items are further compressed. It is sometimes the case that the values for the speed data, the gain signal, the speed feedback data, etc., do not range from 0 to the maximum value as specified in FIG. 9, and hence the number of bytes required for representing the respective data items can be reduced. In addition, the data items may be abridged. For example, for those data items for which the fine resolution is not necessary (for example, for the speed data, the speed feedback data, the load feedback data, etc.), the data values may be rounded, for example, to the closest multiple of 2: 0, 2, 4, 6, 8, - - - , 2n, which are numbers stepped by two. Then, by dividing these numbers by two, the maximum data values can be reduced to one half. Further, for those data items, such as the gain signal, for which the range of the utilized values is limited depending on the machine involved, the number of distinct data frames may practically be limited, for example, to 1000 without adverse effects. Then, the numbers of bytes required to represent such data items can further be reduced than the values shown in FIG. 9. With the above abridgments or compression of data items, the data received and transmitted at the servo systems 3 and the spindle systems 4 of FIG. 18 may further be compressed by two and four bytes, respectively.

Then, the number n of spindles or axes that can be controlled within one IT (predetermined interval of control time) is:

$$(2+1)\times 10+19n\times 10+(2+1)\times 10+17n\times 10=2000000\times 0.002 \quad (5)$$

simplifying the above equation, we obtain:

$$60+360n=4000 \quad (5')$$

and hence approximately, $$n=10.94 \quad (5')$$

Thus, up to ten axes can be controlled.

Figure 15:
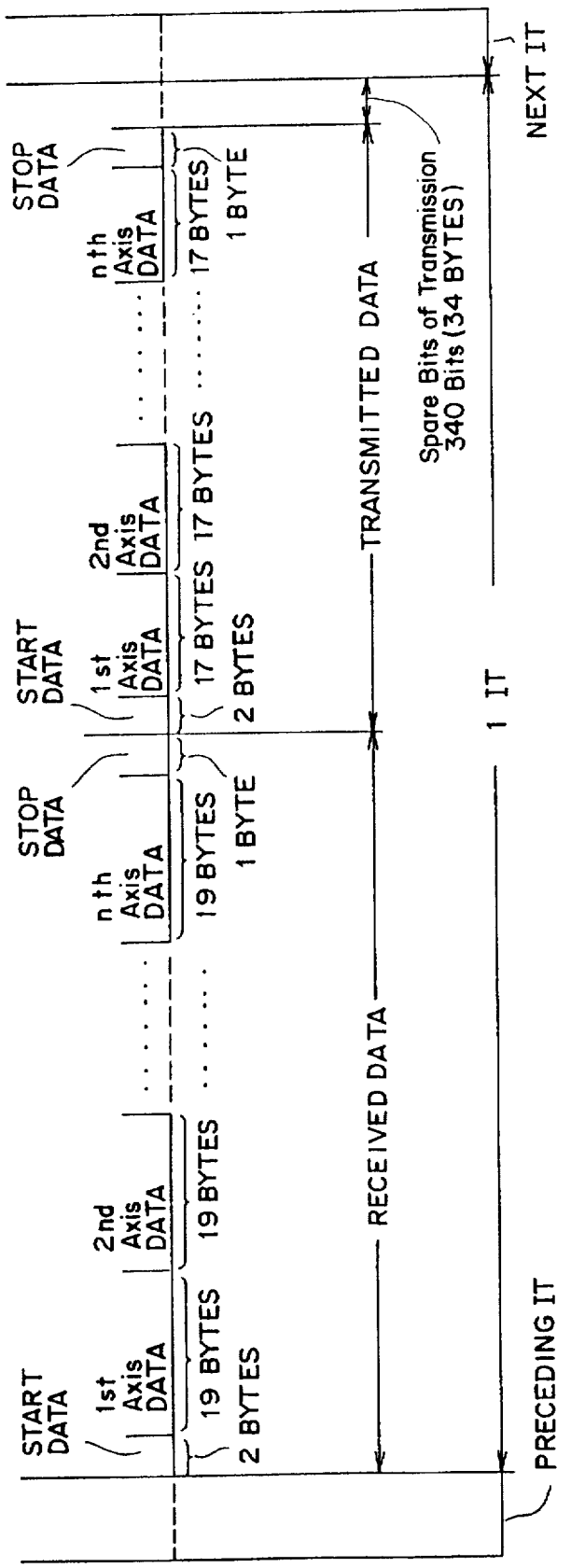
FIG. 15 is a diagram showing the format of the data received and transmitted within a predetermined interval of control time utilizing the data formats of FIG. 14.

FIG. 15 is a diagram showing the format of the data received and transmitted within a predetermined interval of control time utilizing the data formats of FIG. 14.

Figure 1:
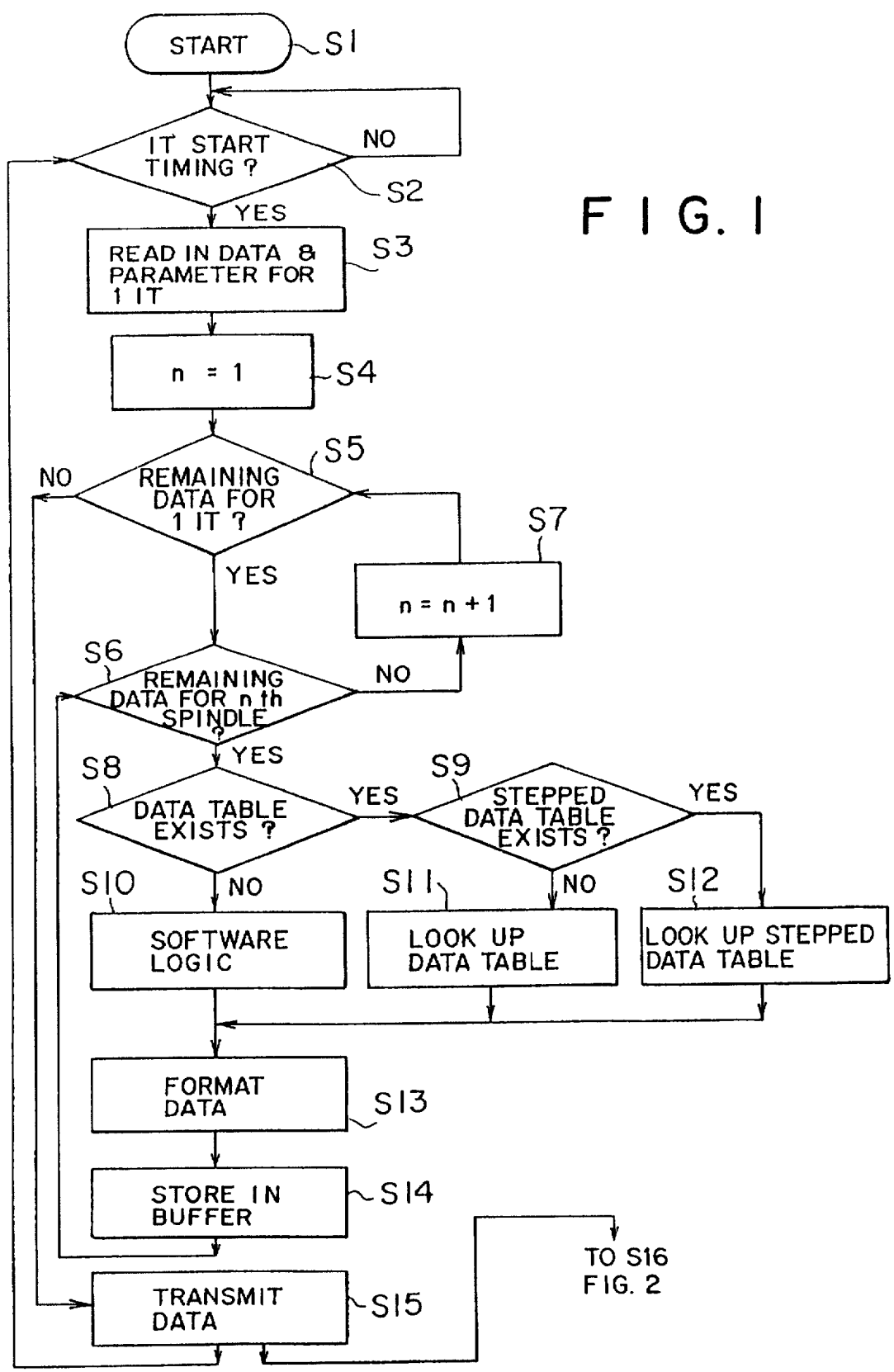
FIG. 1 is a flowchart showing the procedure for data transmission from the main control unit 1 to the servo systems 3 and the spindle systems 4 of FIG. 18.
Figure 2:
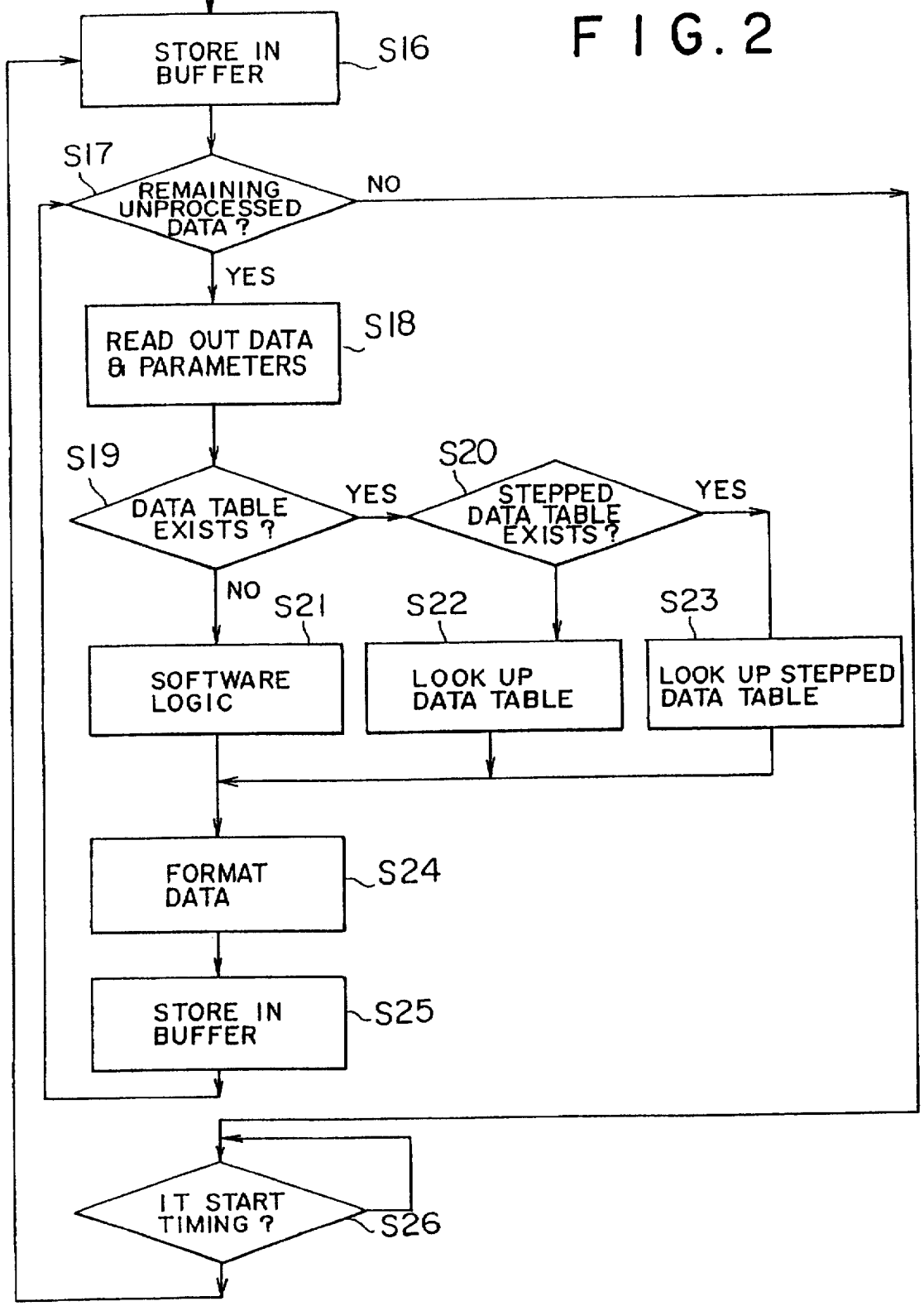
FIG. 2 is a flowchart showing the procedure for data reception at the servo systems 3 and the spindle systems 4 of FIG. 18.
Figure 3:
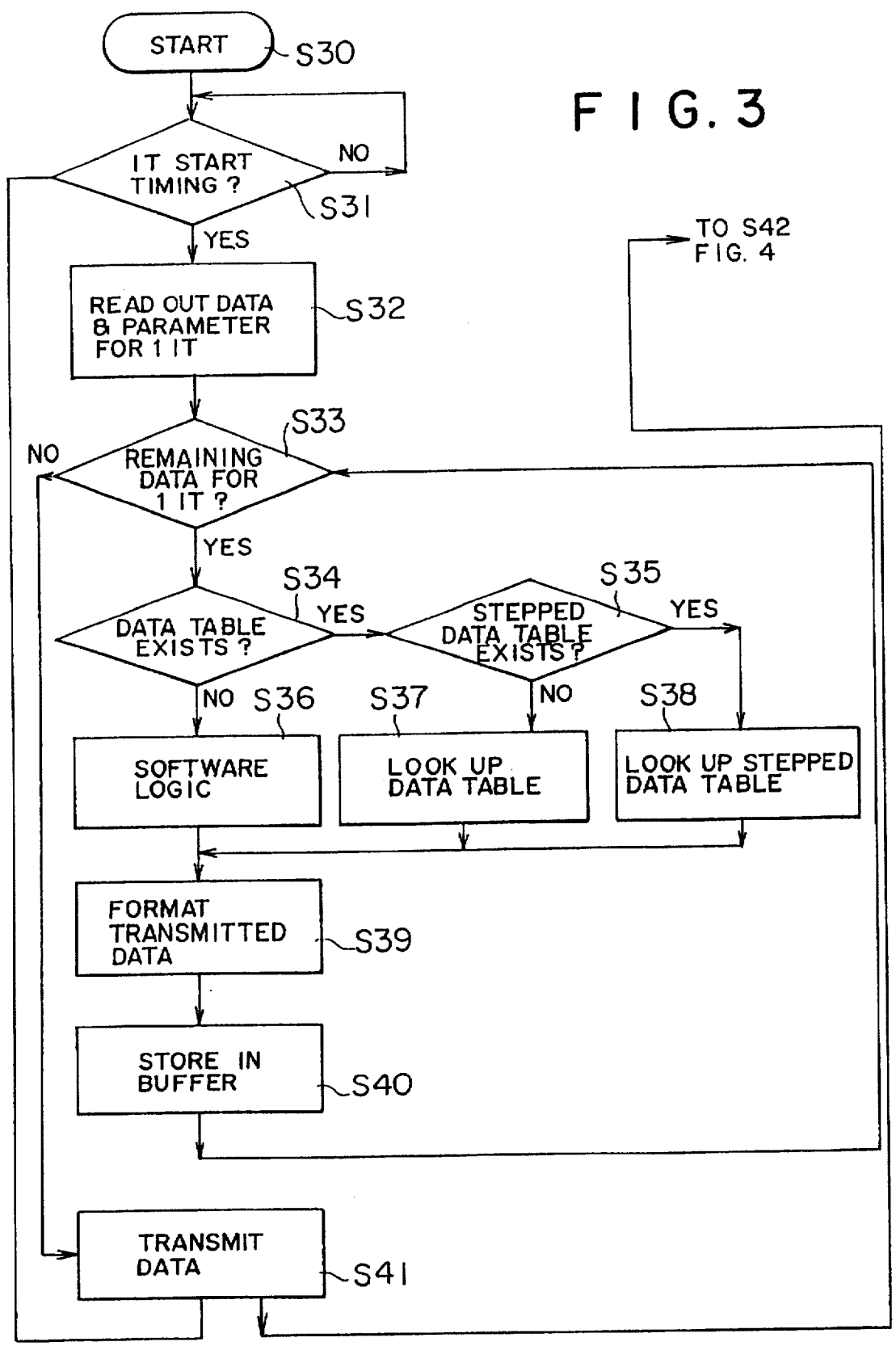
FIG. 3 is a flowchart showing the procedure for data transmission from the servo systems 3 and the spindle systems 4 to the main control unit 1 of FIG. 18.
Figure 4:
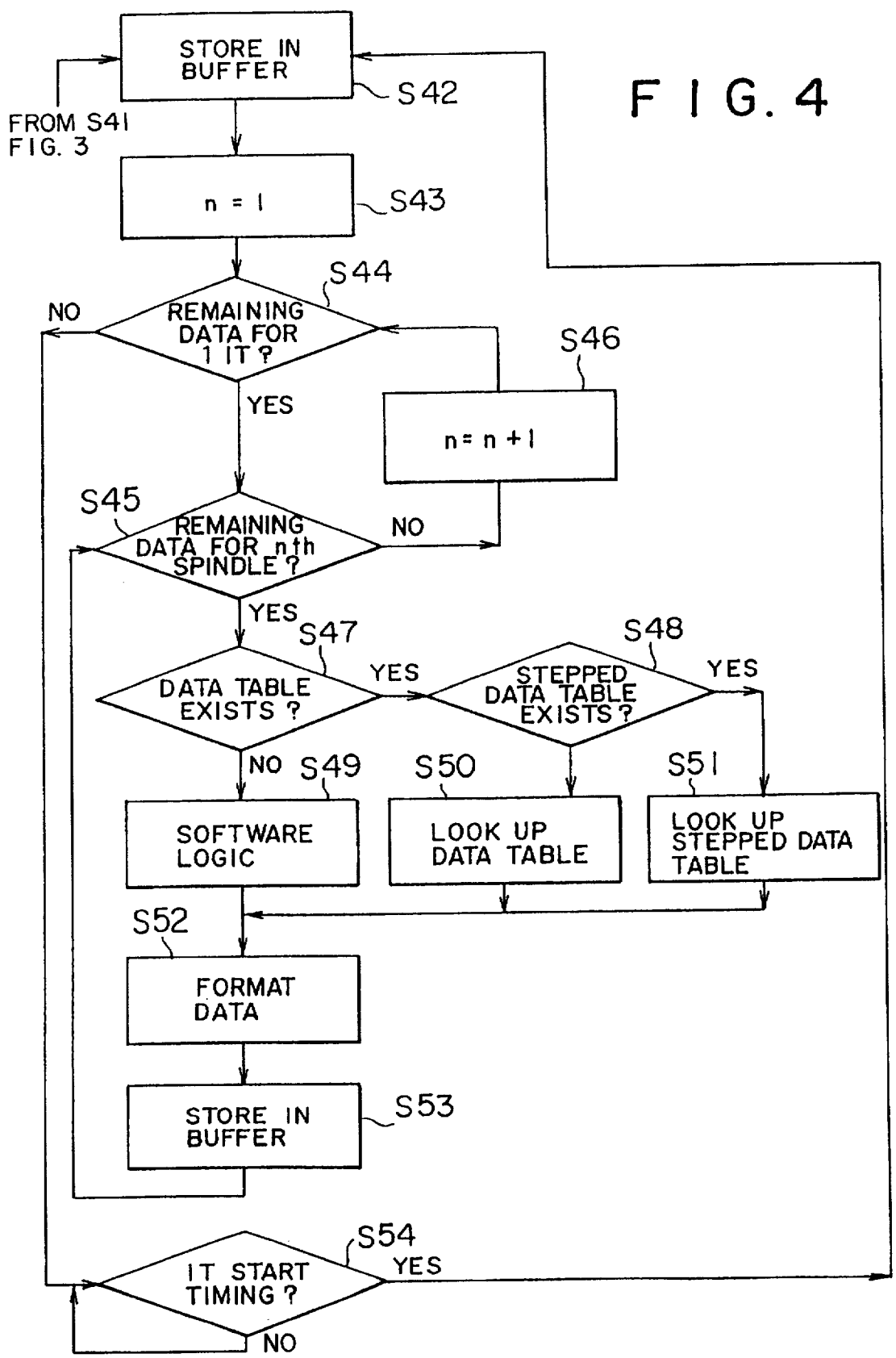
FIG. 4 is a flowchart showing the procedure for data reception at the main control unit 1 of FIG. 18.

Next, referring to FIGS. 1 through 4, the procedures the data transmission and data compression is described. FIG. 1 is a flowchart showing the procedure for data transmission from the main control unit 1 to the servo systems 3 and the spindle systems 4 of FIG. 18. FIG. 2 is a flowchart showing the procedure for data reception at the servo systems 3 and the spindle systems 4 of FIG. 18. FIG. 3 is a flowchart showing the procedure for data transmission from the servo systems 3 and the spindle systems 4 to the main control unit 1 of FIG. 18. FIG. 4 is a flowchart showing the procedure for data reception at the main control unit 1 of FIG. 18.

In FIG. 1, the procedure at the main control unit 1 is started at step S1. At step S2, it is determined whether or not it is at the IT start timing. If the determination is affirmative at step S2, the execution proceeds to step S3. Otherwise, the execution sits in a waiting loop until the IT start timing arrives. At step S3, the data and parameters are read out from the memory 102 in which the transmitted data and parameters are stored. At step S4, the number of controlled axis n is initialized to one (n=1), and the execution proceeds to step S5.

At step S5, it is determined whether or not the data remains for the current IT. If there remains data, the execution proceeds to step S6. (When, after several execution cycles of the following steps S6 through S14, the determination at step S5 becomes negative, the execution proceeds to step S15, as described below.) At step S6, it is determined whether or not the data remains for the nth axis. If the determination is negative at step S6 (that is, if no data remains for the nth axis), the execution returns to step S5 after incrementing the number n at step S7. On the other hand, if the determination is affirmative at step S6, the execution proceeds to step S8.

At step S8, it is determined whether a data table is available for converting the current data element. When a data table exists, the data item is processed by the data table lookup process; otherwise it is processed by the software logic implemented by a program. In the first execution cycle, it is determined whether or not a data table exists for the first data element (the position data in the case of this embodiment) for the first axis. When the data table exists, the execution proceeds to step S9. Otherwise, the execution proceeds to step S10.

At step S10, the decimal (base 10) numbers are first converted into decimally coded base 36 numbers by means of, for example, the well known division algorithm implemented by a program. Namely, the numbers are repeatedly divided by 36 by means of a program until the dividend becomes less than 36, and the successive remainders are obtained. These remainders arranged in reverse order (such that the first obtained remainder, representing the least significant digit, appears at the tail) represent the decimally coded base 36 numbers. The decimally coded base 36 numbers thus obtained are then converted into base 36 numbers, utilizing the correspondence of the decimally coded base 36 digits to the base 36 codes are shown in FIG. 10.

At step S9, it is determined whether or not a stepped data table for data compression exists. If the determination is affirmative the execution proceeds to step S12. Otherwise, the execution proceeds to step S11.

At step S11 the data values represented in base 10 are converted into corresponding base 36 codes by means of a conversion table lookup. FIG. 5 is a table showing the conversion of the numbers represented in base 10 into corresponding base 36 codes, where the rightmost column shows the seven most significant digits of the base 10 numbers and the head row shows the least significant digit thereof. The numbers in base 36 code are shown in respective entries. Thus, the numbers represented in base 10 can be converted into corresponding base 36 codes by means of the conversion table of FIG. 5. For example, the hexatrigintal code 47 (base 36) corresponding to the number 151 (base 10) can be retrieved from the entry at the intersection of the row at the most significant digit 0000015 (base 10) and the column at the least significant digit 1 (base 10).

Due to the hardware limitations for the memory organization of the main control unit 1 of FIG. 18, it may be difficult to implement the data table in a tabular form as shown FIG. 5. Then, the data table can be stored in memory in the form of a linear array as follows. Assuming that the top address of the data table is 10000, the respective entries of the data table are stored at addresses in ascending order. For example, the base 36 code 47 (base 36) corresponding to the number 151 (base 10), is stored at the address:

10000+151=10151 (base 10).

Then, by reading out the data item stored at 10151, the hexatrigintal code 47 (base 36) can be retrieved. Similarly, any hexatrigintal code corresponding to a decimal number can be retrieved by reading out the address which is obtained by adding the decimal number to the start address of the data table.

At step S12, on the other hand, the values of the data represented in base 10 are converted into corresponding base 36 codes by means of a stepped data table for the compression of the data. FIG. 7 shows a stepped conversion table for converting the six-digit base 10 numbers into base 36 codes stepped by two, where the rightmost column shows the five most significant digits of the base 10 numbers and the head row shows the least significant digit thereof. The respective entries represent the base 36 codes corresponding to the base 10 numbers. These base 36 codes are obtained as follows. First, the base 10 numbers are rounded to an even number namely, the base 10 numbers are divided by two and the resulting quotients are rounded. Next, each rounded quotient in base 10 is successively divided by 36, thereby obtaining successive remainders. These remainders arranged in reverse order represent the decimally coded base 36 number corresponding to the rounded quotient. Thus, the decimally coded base 36 number is further converted into corresponding the base 36 code. At step S12, the base 10 numbers are converted into the corresponding base 36 codes by the table lookup process using the table of FIG. 7. Thus, the number 21 (base 10), for example, is converted into B (base 36).

In the case of the stepped data table of FIG. 7, the numbers are stepped by two. If higher compression of data is desired, the numbers stepped by three or more may be used. On the other hand, if the characteristic of the value of data item becomes non-linear, or a higher resolution is desired in a certain region of the data value, the correspondence from the base 10 numbers to the base 36 codes may be modified in such region, to secure, for example, the one-to-one correspondence therein.

After the steps S10, S11, and S12, the execution proceeds to step S13, where the transmission data is formatted. Namely, the label element and the stop element are added to the head and the tail of the data item. As described above by reference to FIGS. 12 and 13, the internal labels and the stop elements may be abridged. After step S13, the execution proceeds step S14, where the formatted data items for the current axis n are stored in the buffer within memory 102. Thereafter, the execution returns to step S6 to repeat the steps S6 through S14 until all the data items for the current axis n are processed and stored in the memory 102.

When it is determined at step S6 that the data for the current axis n (the first axis in the case of the first execution cycle of steps S6 through S14), the number n representing the current axis is incremented at step S7, and the execution returns to step S5, where it is determined whether or not the data items for the current IT remain. When the determination is affirmative at step S5, the execution cycle of steps S6 through S14 is repeated for the axis n.

When it is finally determined at step S5 that no data items remain for the current IT, the execution proceeds to step S15, where the data formatted and stored in the buffer within memory 102 are transmitted to the servo systems 3 or the spindle systems 4, in synchronism with the transmission timings. Thereafter, the n is reset (n=0), and the execution returns to step S2 where the start timing of the next IT is waited. Thus, the procedure of the steps S2 through S15 is repeated at the main control unit 1 for each IT interval.

FIG. 2 is a flowchart showing the procedure for data reception at the servo systems 3 and the spindle systems 4 of FIG. 18. At step S16, the data and parameters for the respective axes transmitted from the main control unit 1 via the optical fiber cable 6 are stored in the buffer within the memory 302 of the servo systems 3 or the memory 402 of the spindle systems 4. At step S17, the servo systems 3 or the spindle systems 4 read out the data after the label element for the respective axis and determines whether or not the unprocessed data remains within the buffer. If there remains data, the execution proceeds to the next step S18. Otherwise, the execution proceeds to step S26, where the start timing of the next IT is waited.

At step S18, the data and parameters situated after the label are read out from the buffer within the memory 302 or 402. At step S19, it is determined whether a data table is available for converting the current data element. When a data table exists, the data item is processed by the data table lookup process; otherwise it is processed by the software logic implemented by a program. When the data table exists, the execution proceeds to step S20. Otherwise, the execution proceeds to step S21.

At step S21, the base 36 number codes are returned to corresponding decimal (base 10) numbers by means of a program. This is the inverse process of the conversion at step S10 in FIG. 1. Thus, for example, the maximum value of the position data: 1NJCHR (base 36) may be restored to corresponding decimal number as follows: First, each digit (1 through Z) of the base 36 code is represented by corresponding decimally coded base 10 numbers. FIG. 11 is a conversion table from the base 36 code digits to decimally coded base 36 numbers. Thus, the above code 1NJCHR in base 36 is converted into decimally coded base 36 number: [1] [23] [19] [12] [17] [27]. Further, the corresponding decimal number is obtained from the decimally coded base 36 representation as follows:

$$1 \times 36^5 + 23 \times 36^4 + 19 \times 36^3 + 12 \times 36^2 + 17 \times 36^1 + 27 \times 36^0 =$$
$$60466176 + 38631168 + 886464 + 11552 + 612 + 27 =$$
$$99999999 \quad \text{(base 10)}$$

At step S20, it is determined whether or not a stepped data table for data compression exists. If the determination is affirmative the execution proceeds to step S23. Otherwise, the execution proceeds to step S22. At step S22, the data values represented in base 36 code are converted into corresponding base 10 numbers by means of a conversion table lookup. FIG. 6 is a table showing the conversion of the numbers represented in base 36 into corresponding decimal numbers, where the rightmost column shows the five most significant digits of the base 36 code numbers and the head row shows the least significant digit thereof. The corresponding decimal numbers are shown in respective entries. Thus, the numbers represented in base 36 can be converted into corresponding decimal numbers by means of the conversion table of FIG. 6. For example, the decimal number 151 corresponding to the code 000047 (base 36) can be retrieved from the entry of the conversion table at the intersection of the row at the five most significant digits 00004 (base 36) and the column at the least significant digit 7 (base 36). The conversion table of FIG. 6 may be implemented as a linear array as in the case of the table of FIG. 5.

At step S23, on the other hand, the values of the data represented in base 36, which are obtained on the basis of the stepped conversion from base 10 numbers at step S12 in FIG. 1, are restored to corresponding base 10 codes by means of a reverse stepped data table. FIG. 8 shows a reverse stepped conversion table for restoring the stepped base 36 codes, as obtained using the table of FIG. 7, into corresponding six-digit decimal numbers stepped by two, where the rightmost column shows the two most significant digits of the base 36 code numbers and the head row shows the least significant digits thereof. The respective entries of the table represent the decimal numbers corresponding to the base 36 codes. Thus, the hexatriginal code B (base 36), for example, is converted into corresponding decimal number 22 (base 10) by the table lookup of the entry at the intersection of the row at the most significant digit 00 and the column at the least significant digit B. It is noted that the stepped conversion tables (e.g., the table of FIG. 7) within the main control unit 1 for converting the base 10 numbers into base 36 codes and the reverse stepped conversion tables (e.g., the table of FIG. 8) within the servo systems 3 or the spindle systems 4 for restoring the base 36 codes to the base 10 numbers are paired, such that the data values that are first converted into compressed base 36 codes by means of stepped conversion tables and then are transmitted in the compressed base 36 codes from the main decimal unit 1 are restored to the original decimal values by the reverse table lookup conversion at the servo systems 3 or the spindle systems 4.

After the steps S21, S22, and S23, the execution proceeds to step S24, where the received data is formatted. When the label and/or end elements are abridged at the side of the main control unit 1 before transmission, the necessary labels and/or end elements are added in accordance with the values of the associated parameters, to obtain the predetermined data formats. By the way, the formatting of the received data may be effected immediately after step S16 instead of after the data conversion steps S21 through S23.

Next at step S25, the formatted data items are stored in the buffer within memory 302 or 402. Thereafter, the execution returns to step S17 to repeat the steps S18 through S25 until all the data items for the current IT are processed and stored in the buffer memory. When the determination at step S17 finally becomes negative (i.e., all the received data for the current IT are processed), the execution proceeds to step S26 where the start timing of the next IT is waited. When the start timing of the next IT arrives, the execution returns to step S16 to repeat the steps S17 through S26. When the respective servo systems 3 or spindle systems 4 need the received data, the necessary data are read out from the buffer in the memory 302 or 402 in which the data have been stored at step S25.

Each time the data at the respective spindles or axes are sampled and the calculations thereon within the servo systems 3 or the spindle systems 4 are finished, the obtained data are stored in the memory 302 or 402. The data are thence transmitted to the main control unit 1 within the respective ITs. Next, the method of data conversion and transmission from the servo systems 3 and the spindle systems 4 to the main control unit 1 is described by reference to FIGS. 3 and 4.

FIG. 3 is a flowchart showing the procedure for data transmission from the servo systems 3 and the spindle systems 4 to the main control unit 1 of FIG. 18. In FIG. 3, the procedure at the servo systems 3 or the spindle systems 4 is started at step S30. At step S31, it is determined whether or not it is at an IT start timing. If the determination is affirmative at step S31, the execution proceeds to step S32. Otherwise, the execution sits in a waiting loop until the IT start timing arrives. At step S32, the data and parameters are read out from the memory 302 or 402 in which the transmitted data and parameters are stored.

At step S33, it is determined whether or not the data remains for the current IT. If there remains data, the execution proceeds to step S34, where it is determined whether a data table is available for converting the current data element. When a conversion data table exists, the data item is processed by the data table lookup process; otherwise it is processed by the software logic implemented by a program.

If the determination is affirmative at step S34, the execution proceeds to step S36, where the decimal (base 10) numbers are converted into corresponding base 36 numbers by means of a program implementing the software logic. The method of conversion is similar to that at step S10 in FIG. 1.

At step S35, it is determined whether or not a stepped conversion data table for data compression exists. If the determination is affirmative the execution proceeds to step S38. Otherwise, the execution proceeds to step S37. At step S37, the data values represented in base 10 are converted into corresponding base 36 codes by means of a conversion table lookup. This conversion is similar to that at step S11 of FIG. 1 described above. At step S38, on the other hand, the values of the data represented in base 10 are converted into corresponding base 36 codes by means of a stepped data table for the compression of the data. The stepped conversion of the base 10 numbers into corresponding compressed base 36 codes is similar to that at step S12 of FIG. 1.

After the conversion steps S36, S37, and S38, the execution proceeds to step S39, where the transmission data is formatted in a manner similar to that at step S13 of FIG. 1. Further at step S40, the formatted data items are stored in the buffer within memory 302 or 402. Thereafter, the execution returns to step S33 to repeat the steps S33 through S40 until all the data items for the current IT are processed and stored in the memory 302 or 402.

When it is determined at step S33 that no data items remain for the current IT, the execution proceeds to step S41, where the data formatted and stored in the buffer within memory 302 or 402 are transmitted to the main control unit 1 in synchronism with the transmission timings. Thereafter, the execution returns to step S31 where the start timing of the next IT is waited. Thus, the procedure of the steps S31 through S41 is repeated for each IT interval.

FIG. 4 is a flowchart showing the procedure for data reception at the main control unit 1 of FIG. 18. At step S42, the groups of data transmitted via the servo systems 3 are stored in the buffer within the memory 102 of the main control unit 1 corresponding to respective axes.

First at step S43, the current number n of axis is initialized to one (n=1). At step S44, it is determined whether or not the data remains for the current IT. If there remains data, the execution proceeds to step S45. At step S45, it is determined whether or not the data remains for the nth axis. If the determination is negative at step S45 (that is, if no data remains for the nth axis), the execution returns to step S44 after incrementing the number n at step S46. On the other hand, if the determination is affirmative at step S45, the execution proceeds to step S47.

At step S47, it is determined whether a data table is available for converting the current data element. When a data table exists, the data item is processed by the data table lookup process; otherwise it is processed by the software logic implemented by a program. When the data table exists, the execution proceeds to step S48. Otherwise, the execution proceeds to step S49. At step S49, the decimal (base 10) numbers are converted into base 36 numbers by means of a program. The conversion method is similar to that at step S21 in FIG. 2. At step S48, it is determined whether or not a stepped data table for data compression exists. If the determination is affirmative the execution proceeds to step S51. Otherwise, the execution proceeds to step S50. At step S50, the data values represented in base 10 are converted into corresponding base 36 codes by means of a conversion table lookup. This table lookup step is similar to that at step S22 in FIG. 2. At step S51, on the other hand, the values of the data represented in base 10 are converted into corresponding base 36 codes by means of a stepped data table for the compression of the data. This conversion is similar to that at step S23 in FIG. 2.

After the steps S49, S50, and S51, the execution proceeds to step S52, where the transmission data is formatted in a manner similar to that at step S24. After step S52, the execution proceeds step S53, where the formatted data items for the current axis n are stored in the buffer within memory 302 or 402. Thereafter, the execution returns to step S45 to repeat the steps S47 through S53 until all the data items for the current axis n are processed and stored in the memory 302 or 402.

When it is determined at step S45 that the data for the current axis n no longer remains, the number n representing the current axis is incremented at step S46, and the execution returns to step S44, where it is determined whether or not the data items for the current IT remain. When the determination is affirmative at step S44, the execution cycle of steps S44 through S53 is repeated. When it is finally determined at step S44 that no data items remain for the current IT, the execution proceeds to step S54, where the data formatted and stored in the buffer within memory 302 or 402 are transmitted to the main control unit 1, in synchronism with the transmission timings. Thereafter, the execution returns to step S42, to repeat the procedure as described above.

By the way, it is noted that the determination at step S8 and step S9 in FIG. 1, at step S19 and step S20 in FIG. 2, at step S34 and step S35 in FIG. 3, and at step S47 and step S48 in FIG. 4, may be effected on the basis of the values of the parameters associated and transmitted with respective data items. The values of the parameters indicate whether the conversion is to be effected by means of the software logic, the simple conversion table lookup, or the stepped conversion table lookup method. Further, the determination whether the label elements and the end elements are to be attached to or abridged for the respective data elements may be effected on the basis of the values of parameters associated therewith. Then, the determination at step S13 in FIG. 1, for example, whether or not the label and the end elements are to be added or abridged is effected in accordance with the values of the parameter. Further, the determination at step S24 in FIG. 2, for example, whether the addition of label and/or end elements to the respective data items is necessary (that is, whether the label and/or the end elements have been abridged at the transmitting side and hence should be added at the receiving side) is effected on the basis of the values of the parameter associated with the respective data items.

In accordance with this embodiment, up to ten spindles or axes can be controlled within one IT. Further, there remains an allowance or margin of 340 bits within each IT even when the maximum number of axes (i.e., ten axes) are controlled. Thus, the parameters for the servo and the main axes may be transmitted for the spindles in need thereof in the margin time interval of each IT.

In the case of the above embodiment, the data is transmitted and received through a single optical fiber cable. This invention, however, is applicable to data transmission via RS232C. Further, although the above embodiment relates to serial data transmission, this invention is applicable to parallel data transmission as well. Furthermore, in the case of the above embodiment, the decimal values are compressed into base 36 codes. However, the same advantage of data compression is obtained by converting the decimal numbers into any number system for which the base is greater than ten. In accordance with the EIA standard by which one byte consists of ten bits (10 bits/byte), the base 128 (=$2^7$) and the base 256 (=$2^8$) number code systems are;the upper limits of bases of the number system. If, however, other standards are adopted, the number code systems whose base exceeds 256 may be adopted for implementing this invention.

Furthermore, in the case of the above embodiment, the data are processed for each IT. However, when the processing speed of the terminals is slow, the data for two ITs may be processed and transmitted from the main control unit 1 within a single IT. In the case of the above embodiment, the data conversion, etc., is effected primarily by software. However, the same procedure may be implemented partially by hardware based on firmware, or wholly by hardware. In addition, in the case of the above embodiment, within the transmitted information, only the data element portions are compressed. The same compression technique, however, can be applied to label elements as well. The label elements can be compressed easily by means of data table lookup method.

Figure 16:
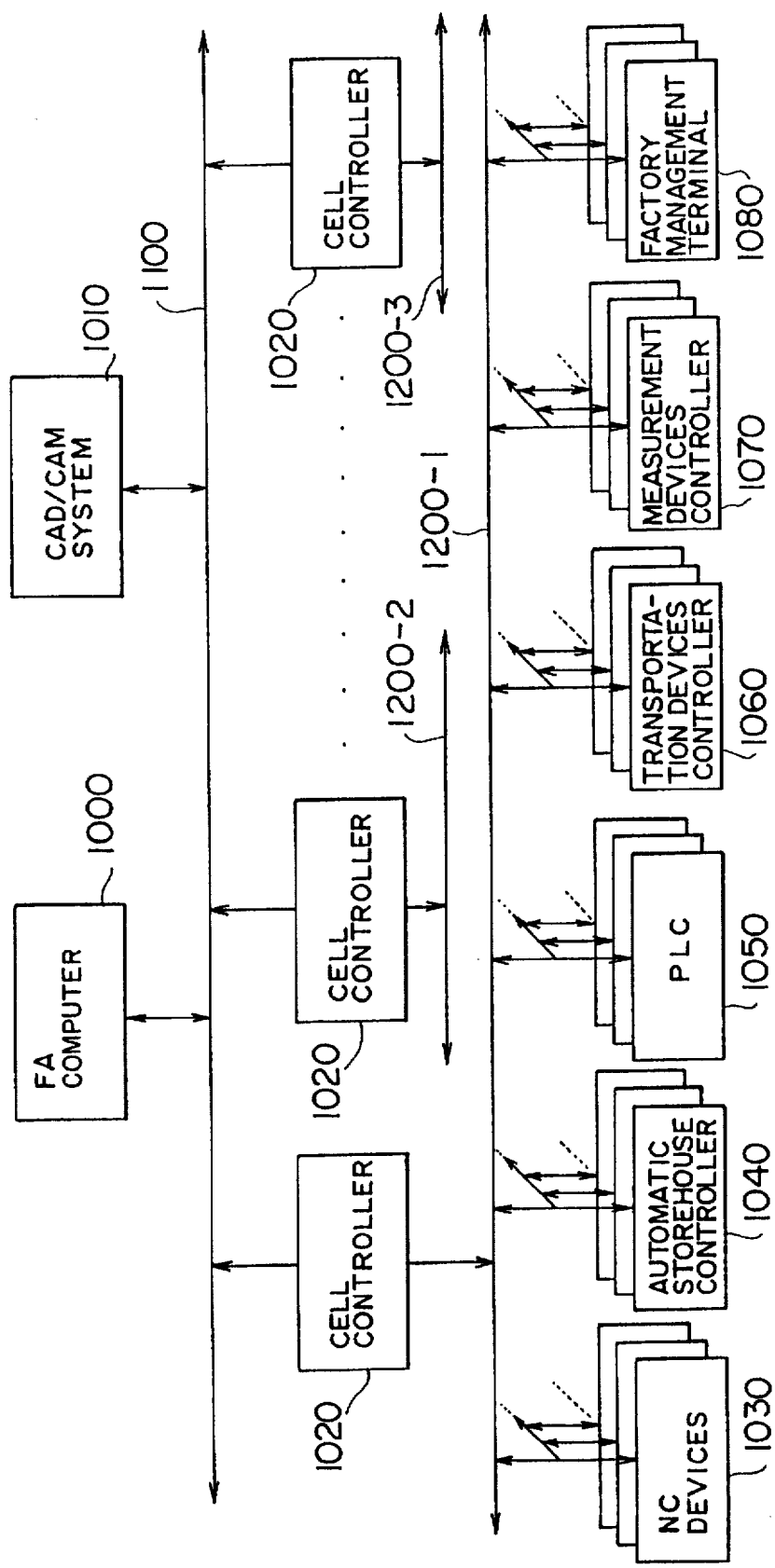
FIG. 16 is a diagram slowing the system centered around a master FA computer with subordinate cell controllers, to which the various subordinate systems are linked.
Figure 17:
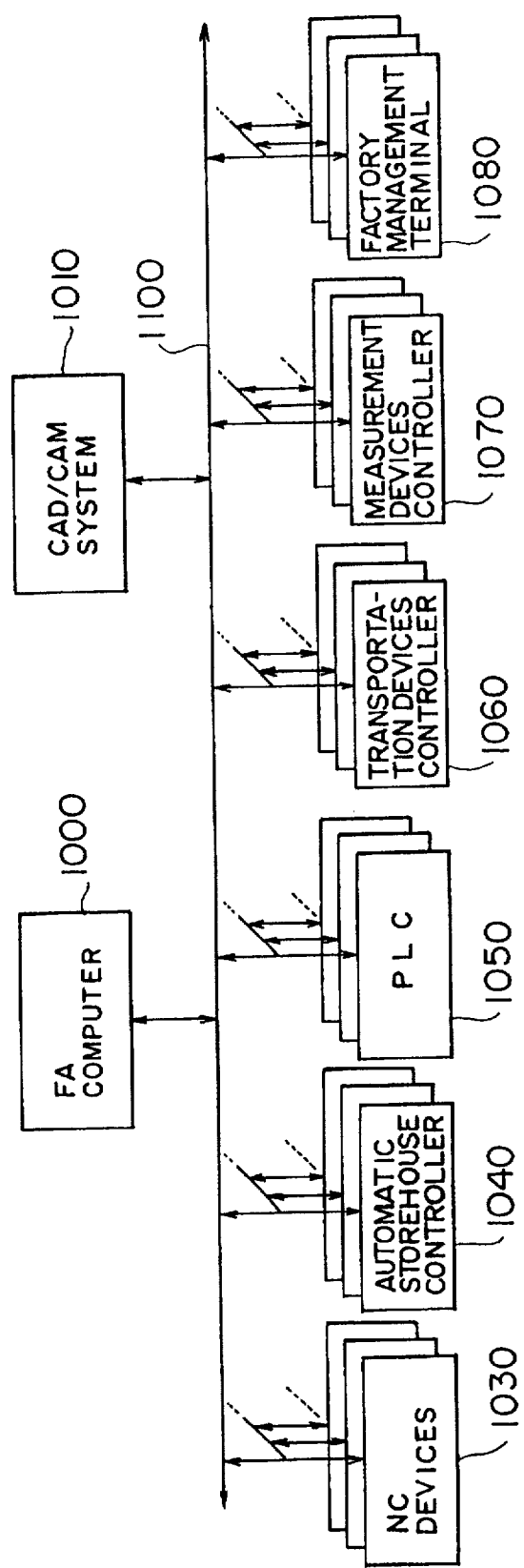

Furthermore, this invention is applicable to data communications within FA (factory automation) system. FIG. 16 is a diagram showing the system centered around a master FA computer with subordinate cell controllers, to which the various subordinate systems are linked. FIG. 17 is a diagram showing the system similar to that of FIG. 16, from which, however, the cell controllers are dispensed with. In FIG. 16, for example, the data is transmitted to and from the FA computer 1000, via the transmission lines 1100,1200-1 through 1200-3 and the subordinate cell controllers 1020, from and to the further subordinate device groups such as the numerically controlled devices 1030, automatic storehouse controllers 1040, PLC groups 1050, transportation devices controllers 1060, measurement device controllers 1070, and factory management terminals 1080. The data transmission may also occur among the subordinate systems, and to and from the CAD/CAM system 1100. The data transmission in the system of FIG. 17 is similar to that of the system of FIG. 16.

In the case of the systems of FIGS. 16 and 17, the decimal number data represented in a character representation code system such as the ASCII code may be converted into corresponding higher base number codes (e.g., the base 36 codes) represented in the same ASCII code system before transmission and restored to the original decimal values after reception, such that the data is transmitted in compressed form. The principle of data compression is the same as in the case of the above embodiment. It goes without saying that the data compression principle according to this invention is applicable to the data transmission between the main control unit 1 and the display system 2 in system of FIG. 18. Further, the same principle is applicable to computer systems including those based on personal computers.

By the way, it is noted that the method of conversion and restoration of the decimal number values may be selected in accordance with the system requirements. Generally, the implementation of software logic requires less memory capacity than that by the table lookup. On the other hand, the table lookup method requires less time. The tradeoff must be evaluated to select and combine the two methods to balance the performance and the cost.

What is claimed is:

1. A method for transmitting electrical data signals between information units of a control system over an electrical transmission medium, said electrical data signals representing decimal numbers corresponding to parameters of said system, comprising the steps of:

converting decimal number parameters of said system to be transmitted, said decimal number parameters being reresented in a character representation code system as 8-bit characters, into base n numbers, where n is a whole number greater than 10;

converting said base n numbers into binary byte codes of an alphanumeric character representation code system;

transmitting said binary byte codes over said electrical transmission medium;

receiving said transmitted binary byte codes from said electrical transmission medium;

converting received binary byte codes of said character representation code system into received base n numbers; and converting said received base n numbers into said decimal numbers, such that the amount of decimal number data to be transmitted over said electrical transmission medium is reduced as compared with transmission of said 8-bit character representation code.

2. A data transmission method as claimed in claim 1, further comprising the step of: restoring at said receiving unit said decimal numbers from said base n number codes.

3. A data transmission method as claimed in claim 1, wherein said character representation code system consists of a character coding system in accordance with American Standard Code for Information Interchange.

4. A data transmission method as claimed in claim 1, wherein said information units comprise a main control unit and terminals within an automated factory system connected at least by one communication line, said terminals including numerically controlled devices.

5. A data transmission method as claimed in claim 4, wherein said main control unit and terminals are provided with respective memories.

6. A data transmission method as claimed in claim 1, wherein said information units comprise: a main computer, a CAD/CAM system, cell controllers, and terminal device groups within an automated factory system connected by at least one communication line.

7. A data transmission method as claimed in claim 1, wherein said conversion is effected by means of a software logic implemented by a program.

8. A data transmission method as claimed in claim 1, wherein said conversion is effected by means of a table lookup method, based on a conversion table establishing correspondence from decimal numbers to said base n number codes.

9. A data transmission method as claimed in claim 1, wherein said conversion is effected by means of a stepped conversion table lookup method.

10. A data transmission method as claimed in claim 1, wherein a method of conversion from said decimal numbers to said base n number codes is selected in accordance with a parameter associated with each data item including said decimal numbers, said method of conversion being selected from: software logic implemented by a program, a conversion table lookup method, or a stepped conversion table lookup method.

11. A data transmission method as claimed in claim 9, wherein said stepped conversion table establishes a correspondence from decimal numbers rounded to a closest multiple of an integer to said base n number codes corresponding to said rounded decimal numbers divided by said integer, wherein said integer is equal to or greater than two.

12. A data transmission method as claimed in claim 1, wherein a label and an end element are added or abridged at said transmitting unit to each data item including said decimal numbers, in accordance with a predetermined value of a predefined parameter associated with said data item.

13. A data transmission method as claimed in claim 12, wherein a label and an end element are added to each data item whose label and end element are abridged at said transmitting unit, said addition being effected at receiving unit in accordance with a said predetermined value of said predefined parameter associated with each data item.

14. A data transmission method as claimed in claim 1, wherein respective units of data are transmitted in respective time intervals of a predetermined length.

15. A data transmission method as claimed in claim 2, wherein said character representation code system consists of a character coding system in accordance with American Standard Code for Information Interchange.

16. A data transmission method as claimed in claim 2, wherein said information units comprise a main control unit and terminals within an automated factory system connected at least by one communication line, said terminals including numerically controlled devices.

17. A data transmission method as claimed in claim 2, wherein said information units comprise: a main computer, a CAD/CAM system, cell controllers, and terminal device groups within an automated factory system connected by at least one communication line.

18. A data transmission method as claimed in claim 2, wherein said conversion is effected by means of a software logic implemented by a program.

19. A data transmission method as claimed in claim 2, wherein said conversion is effected by means of a table lookup method, based on a conversion table establishing correspondence from decimal numbers to said base n number codes.

20. A data transmission method as claimed in claim 2, wherein said conversion is effected by means of a stepped conversion table lookup method.

21. A data transmission method as claimed in claim 2, wherein a method of conversion from said decimal numbers to said base n number codes is selected in accordance with a parameter associated with each data item including said decimal numbers, said method of conversion being selected from: software logic implemented by a program, a conversion table lookup method, or a stepped conversion table lookup method.

22. A data transmission method as claimed in claim 20, wherein said stepped conversion table establishes a correspondence from decimal numbers rounded to a closest multiple of an integer to said base n number codes corresponding to said rounded decimal numbers divided by said integer, wherein said integer is equal to or greater than two.

* * * * *

UNITED STATES PATENT AND TRADEMARK OFFICE
CERTIFICATE OF CORRECTION

PATENT NO. : 5,786,777
DATED : July 28, 1998
INVENTOR(S) : Hayao HIRAI

It is certified that error appears in the above-identified patent and that said Letters Patent is hereby corrected as shown below:

Column 7, line 20, change "5.42" to --5.47--.

Column 16, line 3, change "reresented" to --represented--.

Signed and Sealed this

Ninth Day of February, 1999

Attest:

Attesting Officer

*Acting Commissioner of Patents and Trademarks*